United States Patent [19]

Keefer

[11] 4,187,173
[45] Feb. 5, 1980

[54] REVERSE OSMOSIS METHOD AND APPARATUS

[76] Inventor: Bowie G. Keefer, 4324 W. 11th Ave., Vancouver, B. C., Canada, V6R 2M1

[21] Appl. No.: 886,429

[22] Filed: Mar. 14, 1978

Related U.S. Application Data

[63] Continuation-in-part of Ser. No. 782,540, Mar. 28, 1977, abandoned.

[51] Int. Cl.² ............................................. B01D 13/00
[52] U.S. Cl. .................................. 210/23 H; 210/136; 210/416 M; 210/433 M; 417/374; 417/392
[58] Field of Search ............... 210/321 R, 136, 416 M, 210/23 H, 433 M; 417/374, 225, 241, 392

[56] References Cited

U.S. PATENT DOCUMENTS

| | | | |
|---|---|---|---|
| 3,365,061 | 1/1968 | Bray | 210/130 |
| 3,558,242 | 1/1971 | Jenkyn-Thomas | 416/374 |
| 3,825,122 | 7/1974 | Taylor | 210/321 R X |

*Primary Examiner*—Frank A. Spear, Jr.
*Attorney, Agent, or Firm*—Carver and Company

[57] ABSTRACT

Reverse osmosis, particularly for water desalination, is achieved using semipermeable membranes which selectively permeate purified water from a feed solution pressurized by reciprocating piston or diaphragm pump. Pump action is assisted by returning pressurized concentrate fluid acting on reverse side of the pump piston or diaphragm. Directional valves controlling alternating admission and venting of concentrate fluid to and from pump cylinder are actuated mechanically by reversal of force applied to the piston rod. Mechanical dwell is provided in the piston or diaphragm motion during directional valve actuation. Pump may be operated by a manual lever or by a crank mechanism on a low speed rotary shaft. An optional differential surge absorber provides continuity of feed solution circulation past membrane surfaces during the return pump stroke, thus minimizing detrimental salt concentration build-up on the membranes.

19 Claims, 9 Drawing Figures

FIG. 9

REVERSE OSMOSIS METHOD AND APPARATUS

CROSS REFERENCES TO OTHER APPLICATIONS

This is a Continuation-in-Part of my application Ser. No. 782,540 filed 28 Mar. 1977 entitled REVERSE OSMOSIS APPARATUS AND METHOD WITH ENERGY RECOVERY RECIPROCATING PUMP now abandoned.

BACKGROUND OF THE INVENTION

1. Field of the Invention

The invention relates generally to reverse osmosis and ultrafiltration fluid separation processes, and is applicable particularly to water desalination and purification by reverse osmosis.

2. Prior Art

Desalination by reverse osmosis is achieved by pumping a feed stream of saline water at an elevated working pressure into a pressure resistant vessel containing an array of semipermeable membranes. Purified product water of greatly reduced salinity permeates across the membranes into low pressure collection channels if the working pressure exceeds feed stream osmotic pressure. Considerable excess working pressure above the feed stream osmotic pressure is required to produce sufficient product water flux across membranes of reasonable surface area, and also to ensure sufficient dilution of the small but finite salt diffusion through the membrane which always exists when there is a concentration gradient across such membranes. For sea water whose osmotic pressure is about 25 Kg/sq. cm, typical working pressure for single stage reverse osmosis is in the order of 70 Kg/sq. cm.

While some of the feed stream permeates through the membranes, the balance becomes increasingly concentrated with salt rejected by the membranes. In a continuous reverse osmosis process, a concentrate stream must be exhausted from the vessel to prevent excessive salt accumulation. In sea water desalination, this concentrate stream may be typically 70% and sometimes as much as 90% of the feed stream. The concentrate stream leaves the vessel at almost full working pressure, but before the concentrate stream is exhausted from the apparatus, it must be depressurized. In common reverse osmosis apparatus the concentrate stream is depressurized by throttling over a suitable back pressure valve, for example a restrictor valve, which regulates the working pressure while dissipating all the pressure energy of the concentrate stream. It is known to recover some of the concentrate stream pressure energy using recovery turbine devices, however such energy recovery devices have mostly seemed practicable only for large stationary plants where efficiency and economy advantages of scale would apply.

Without energy recovery devices, small scale manually operated reverse osmosis desalinators for use in households, life-boats, etc. would be almost unpracticable. Similarly, using wind power for desalination is discouraged by high energy consumption.

Furthermore, for high recovery concentration polarization must be controlled. Concentration polarization in the feed stream is the tendency for a concentration gradient to develop in the feed stream with high salt concentration on the membrane face during reverse osmosis. This tendency results from the bulk transport of saline feed water toward the membrane face and the accumulation of salt in the boundary layer as less saline water permeates through the membrane, balanced by diffusion of salt back out of the boundary layer. Concentration polarization is detrimental especially with feed solutions of high osmotic pressure such as sea water, because the membrane sees a higher concentration which raises the effective osmotic pressure. When concentration polarization occurs, working pressure for given product flux must be increased, product salinity will be increased, and membrane life may be impaired.

Reverse osmosis systems are typically designed to reduce concentration polarization effects by forced convection through the membrane array. Forced convection may be provided by circulating a low ratio of product flow to concentrate flow through suitably configured feed channels between the membrane faces, or by auxiliary recirculation or mechanical stirring devices. It is essential that continuous feed circulation be maintained through the membrane array, because even momentary stagnation of flow may cause severe concentration polarization.

Operation at low ratios of product flow to concentrate flow is also generally favourable to the reduction of concentration polarization effects, but of course increases the feed pumping energy expenditure for given product flow delivery.

SUMMARY OF THE INVENTION

The invention achieves reverse osmosis with low energy consumption, particularly for manually operated or wind driven desalination devices. Concentration polarization effects are reduced by providing means to maintain the continuity of feed flow circulating past the membranes, and by enabling operation at a low ratio of product flow to concentrate flow without excessive energy consumption normally associated with large feed flows. The device has a simple and effective means to control directional valve timing which enables the recovery of fluid pressure energy from the concentrate stream. All embodiments described have dwell means to increase tolerance to valve actuation, thus simplifying manufacture and servicing.

Membrane separation apparatus according to the invention separates the feed fluid into a permeate fluid fraction and a concentrate fluid fraction which respectively are permeated and rejected by semipermeable membrane means. The apparatus is characterized by a reciprocating pump means, a drive means, inlet, outfeed and return conduit means, means communicating with the membrane means to provide essentially uniform pressure and feed fluid flow across the membranes, first and second valve means for directing fluid to and from the membranes, and a dwell means to ensure timely valve actuation. The reciprocating pump means has a cylinder and movable piston means, the piston means dividing the cylinder into a pumping chamber in which feed fluid is pressurized and an expansion chamber in which the concentrate fluid is depressurized. The piston means also separates the pumping and expansion chambers and cooperates with piston rod means extending through the expansion chamber with sealing means to prevent leakage of fluid from the cylinder.

The cylinder and piston rod means have relative diameters which define the cylinder/piston rod proportions such that ratio of swept volume of piston rod means to swept volume of piston means determines the recovery ratio of permeate fluid fraction to total feed fluid flow. The drive means is reciprocable and is mechanically connected to the pump means to apply a reciprocating action to the pump means. The inlet conduit means communicates the pumping chamber with a feed fluid source to admit feed fluid into the pumping chamber, and the outfeed conduit means communicates the pumping chamber with the membrane means to conduct pressurized feed fluid from the pumping chamber to the membrane means. The return conduit means communicates the membrane means with the expansion chamber to conduct the concentrate fluid fraction from the membrane means to the expansion chamber. The first valve means communicates with the expansion chamber and mechanically cooperates with the pump means so as to be shifted between first and second positions upon reversal of the reciprocating action applied to the pump means. The first valve means has a closed intermediate position between the first and second positions. The second valve means is a non-return valve means communicating with the pumping chamber. The first and second valve means cooperate with the conduit means so as to direct fluid from the fluid source and to and from the membrane means. The first valve means is responsive to force applying the reciprocation action to the pump means in such a manner that reciprocating force transmitted to the pump means is reacted in part by the first valve means. The dwell means is characterized by a hydraulic bias effect acting on the piston means to inhibit relative motion of the piston means in one direction as determined by position of the first valve means and to permit relative piston motion in the opposite direction, such that following reversal of force applied to the pump means, the first valve means shifts between the first and second positions thereof prior to reversal of the pumping action. The dwell means is associated with the pump means to ensure that the first valve means is shifted during an interval of zero fluid transfer in the expansion chamber of the pump means. Thus, in a first position of the first valve means, pressurized feed fluid from the pumping chamber is fed to the membranes through the second valve means while concentrate fluid is discharged into the expansion chamber through the first valve means, so that depressurization of the concentrate fluid returning from the membrane means assists in pressurizing the feed fluid. In a second position of the first valve means, depressurized concentrate fluid is vented from the expansion chamber through the first valve means while feed fluid is inducted into the pumping chamber through the second valve means.

A method of membrane separation according to the invention uses an apparatus as generally described above and is characterized as follows. The feed fluid is inducted into the pumping chamber by an induction stroke of the piston means and simultaneously the concentrate fluid is exhausted from the expansion chamber. The direction of force applied to the pump means is reversed and the piston means is biased hydraulically against movement due to reversal of force. Thus reaction of force is transmitted to the first valve means causing the valve means to shift in preference to relative piston means movement so as to mechanically shift the first valve means to direct fluid flow between the pump means and the membrane means. The transmission of reaction forces produces a dwell which causes the valve means to shift across a closed intermediate position thereof during an interval of zero fluid transfer in the expansion chamber thus incurring timely valve shifting. The feed fluid is then pressurized in the pumping chamber by a compression stroke of the piston means which forces pressurized feed fluid to the membrane means, and the concentrate fluid fraction from the membrane means is admitted into the expansion chamber to supplement energy supplied to the piston in the compression stroke by using pressure of the concentrate fluid. The feed fluid is separated into a permeate fluid fraction which passes through the membrane means, and a concentrate fluid fraction which is returned from the membranes to the expansion chamber to recover some fluid pressure for pressurizing the feed fluid.

A detailed disclosure following, related to the drawings, describes a preferred method and apparatus according to the invention which are capable of expression in method and apparatus other than that particularly described and illustrated.

The directions "upwards" and "downwards" refer to the figures as drawn, but clearly the apparatus could be in other orientations.

DETAILED DISCLOSURE

Figure 1:
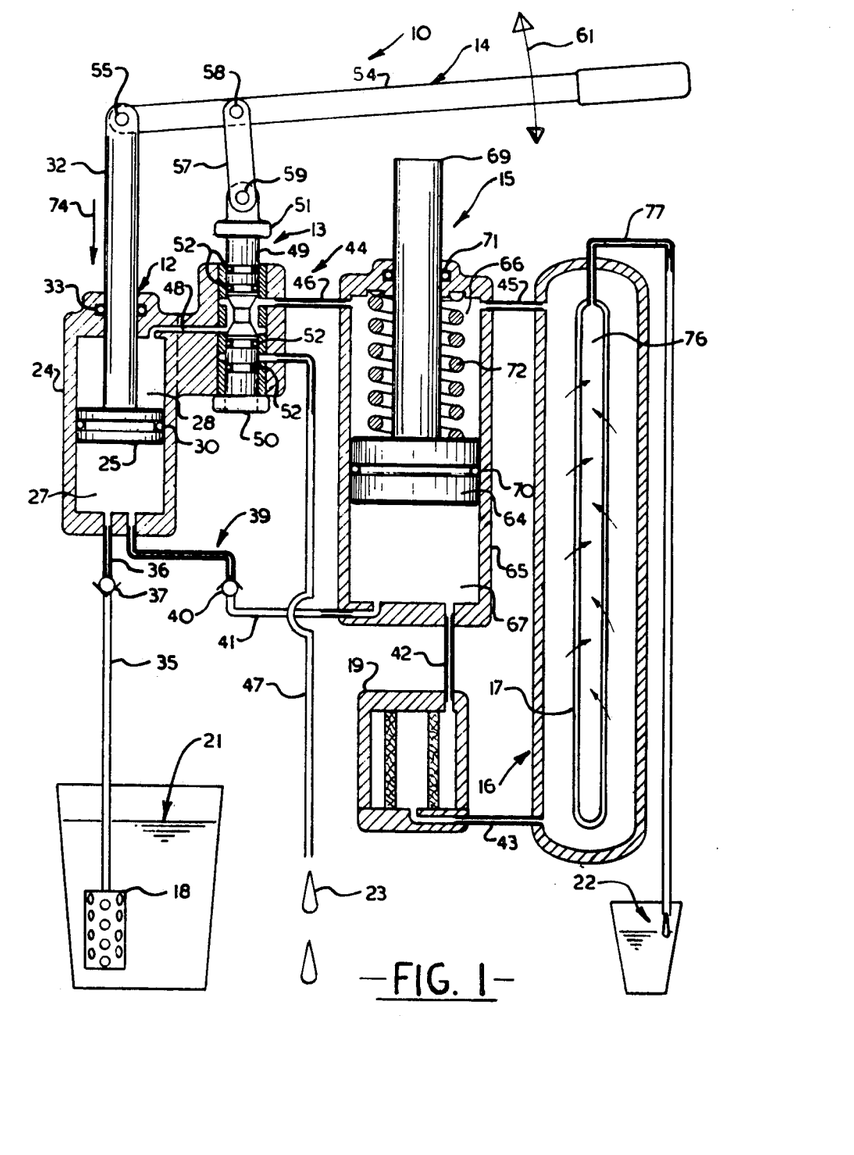
FIG. 1 is a simplified section through a manually powered embodiment of a lever actuated reverse osmosis apparatus according to the invention.

FIG. 1

A first embodiment 10 of a lever actuated membrane separation apparatus according to the invention includes a reciprocating pump means 12, a directional three-way valve assembly 13, a drive means 14 mechanically connected to the pump means and valve assembly, and a differential surge absorber 15. The apparatus further includes a membrane vessel 16 containing semipermeable membrane means 17, and optional low and high pressure filters 18 and 19. Feed fluid 21 is separated into a permeate fluid fraction 22 and a concentrate fluid fraction 23 which are respectively permeated and rejected by the membrane means.

The reciprocating pump means 12 has a pump cylinder 24 and a movable piston means 25, the piston means dividing the cylinder into a pumping chamber 27 in which the feed fluid is pressurized, and an expansion chamber 28 in which the concentrate fluid is depressurized. The piston means cooperates with a piston rod means 32 extending through the expansion chamber, and sealing means 30 and 33 prevent mixing and leakage of fluid. The cylinder 24 and thus the piston means 25, and the piston rod means 32 have relative diameters which define piston rod/cylinder proportions such that a ratio of the swept volume of piston rod means to swept volume of the piston means determines recovery ratio of the permeate fluid fraction to the total fluid fraction. Alternatively, the recovery ratio can be defined in terms of displacement ratio of the piston rod means to the piston means. Inlet conduit means 36 communicate with the pumping chamber 27 to admit feed fluid 21 from a conduit portion 35 immersed in feed fluid, a non-return check valve 37 admitting the feed fluid through the filter 18 and conduit portion 35 whilst preventing return flow from the chamber into the conduit 36. Outfeed conduit means 39 communicate the pumping chamber with the membrane means 17 via the differential surge absorber 15 and filter 19 to conduct pressurized feed fluid from the pumping chamber to the membrane means, a non-return check valve 40 preventing return flow of fluid into the pumping chamber.

The outfeed conduit 39 consists of a conduit portion 41 extending between the differential surge absorber 15 and the pumping chamber, a conduit portion 42 extending between the differential surge absorber and the filter 19, and a conduit portion 43 extending from the filter 19 to the membrane vessel means. A return conduit means 44 communicates the membrane means with the expansion chamber 28 to conduct the concentrate fluid fraction from the membrane means to the expansion chamber 28. The means 44 has a conduit portion 45 extending between the differential surge absorber 15 and the membrane vessel 16, and a conduit portion 46 extending between the directional valve assembly 13 and the differential surge absorber 15. The valve assembly 13 has a vent conduit 47 to conduct the concentrate fluid fraction 23, usually to waste, and a connecting conduit 48 communicating with the expansion chamber 28.

The valve assembly 13 is a three-way directional control valve and has a sliding valve spool 49 having linear travel limited by lower and upper stops 50 and 51 which determine upper and lower limits of travel of the spool respectively, the spool being shown in the upper limit of travel in which the conduit portion 46 is connected with the connecting conduit 48 to conduct the concentrate fluid fraction from the membranes to the expansion chamber. In a lower limit of travel, not shown, the connecting conduit 48 is connected to the vent conduit 47 as will be described. Because water has low viscosity and lubricity, the spool 49 is fitted with dynamic sealing rings 52 of suitable composition, for example glass-filled fluorocarbon polymeric compounds to minimize leakage and prevent spool seizure. Thus, the valve assembly 13 is a two-position, center-closed, three-way valve having a movable spool, the spool having travel between two positions through a closed intermediate position to interchange conduit connections, the travel being limited by stops. The valve assembly 13 directs fluid to or from particular conduits communicating with the expansion chamber 28, and is termed a first valve means. The non-return valves 37 and 40 control flow in conduits communicating with the pumping chamber 27 and are termed second valve means. As will be described, the first and second valve means cooperate with the conduit means so as to direct fluid flow from the fluid source and to and from the membrane means, and clearly alternative first and second valve means can be substituted.

The drive means 14 includes a manually operated lever 54 having an inner end hinged on a hinge pin 55 which is carried at an outer end of the piston rod means 32. A link 57 is pinned at one end with a pin 58 to the lever 54 and at an opposite end with a pin 59 to an outer end of the spool 49. It can be seen that reciprocation action applied to the lever 54 in an arc shown by a double headed arrow 61 results in corresponding linear movement of the piston rod means 32 and the spool 49, relative shifting of the spool and piston rod being dependent on leverage and resistance to motion of the piston means and the spool. The position of the spool 49 determines a hydraulic bias effect on the piston means 25 such that the spool 49 must shift before the piston can reverse. The hydraulic bias inhibits piston movement in one direction and permits the piston means to move relatively easily in an opposite direction, the direction being determined by the spool 49 as follows. When the conduits 46 and 48 are connected, upwards movement of the piston means is resisted by concentrate fluid in the chamber 28 which pressure assists in downwards movement of the piston. When the conduits 47 and 48 are connected, downwards movement of the piston is resisted by the check valves 37 and 40, whereas upwards movement is relatively easy due to vent pressure in the chamber 28. Thus, when the spool is in the upper position as shown in FIG. 1, swinging the lever 54 downwards shifts the spool to the lower position before the piston moves within the cylinder, and vice versa for opposite swinging of the lever. The hydraulic bias causes the piston to serve as a temporary fulcrum for the lever which provides dwell and is of major importance to operation of the invention because the valve spool must shift between its two limits when the piston is stationary because the fluid is essentially incompressible and damage would likely result if the piston shifted before the spool had interchanged connections.

The differential surge absorber 15 has a cylinder 65 and a piston means 64, the piston means dividing the cylinder 65 into a concentrate surge absorber chamber 66 and a feed surge absorber chamber 67. The piston means cooperates with a piston rod means 69 extending through the concentrate surge absorber chamber 66 and has sealing means 70 and 71 to prevent mixing and leakage of fluid. For smooth operation of the surge absorber the seals are selected for low friction characteristics. A compression coil spring 72 encloses the piston rod means and extends between the piston means 64 and the chamber so that the piston means is effectively spring-loaded and double-acting and reciprocable within the cylinder. Thus, the spring means cooperates with the piston means to force the piston means in a direction to exhaust the feed surge absorber chamber. The feed surge absorber chamber 67 is exposed to pressurized feed fluid in the portion 41 of the outfeed conduit 39 and also communicates with the membrane vessel 16 through the conduit portions 42 and 43. The concentrate surge absorber chamber 66 is exposed to the concentrate fluid fraction in the conduit portion 45 of the return conduit means 44 and also communicates with the valve assembly 13 through the portion 46.

The piston rod means 69 and the cylinder 65 of the surge absorber 15 have relative diameters similar to the piston rod/cylinder proportions of the pump means, but have a displacement several times greater and thus can accommodate the recovery ratio of the permeate fluid fraction to the total fluid fraction. The key feature of the differential surge absorber is rigid coupling of the concentrate and feed surge absorber chambers 66 and 67 with a ratio similar to that of the pump means 12, i.e. a similar displacement ratio so as to serve as a load leveller for the pump means. The spring 72 is relatively small and the piston rod means 69 is of relatively small area when compared with the piston means 64, and the differential surge absorber is charged to full effectiveness within a few pump strokes when starting up as will be described. It should be noted that extension of the piston rod means 69 from the surge absorber provides a visual indication of hydrostatic pressure of the system by its position at any instant. Piston rod/cylinder area proportions or displacement volumes can be within the range of 1:10 and 1:2 for practical recovery ratios.

The membrane means 17 are housed in the membrane vessel 16 in suitable arrays known in the art and a low pressure product channel 76 receives product water from the membranes which is discharged through product conduit 77. The geometry of the membrane arrays in the membrane container vessel is designed to ensure sufficient forced convection of the feed fluid to prevent excessive concentration polarization effects. If the feed fluid flow velocity is dropped too low, concentration polarization effects can become severe.

OPERATION

Referring to FIG. 1, as the lever 54 is swung manually upwards about the hinge pin 55, the valve spool 49 is held in its uppermost position against the lower stop 50, closing the vent conduit 47 and connecting the conduit portion 46 with the connecting conduit 48 so as to pass the pressurized concentrate fluid fraction from the membrane vessel 16, through the chamber 66 of the differential surge absorber, through the valve assembly 13 into the expansion chamber 28 to act on a rear face of the piston means 25. The force from the concentrate fluid in the chamber 28 augments force from the lever 54 and the piston means simultaneously travels downwards in the pump cylinder 24 in direction of arrow 74 to pressurize feed fluid in the chamber 27. The check valve 37 is held closed by the feed fluid pressure and the check valve 40 is open to transmit pressurized feed fluid from the pumping chamber 27 through the conduit portion 41 into the feed surge absorber chamber 67 of the differential surge absorber 15. Pressurized feed fluid from the chamber 67 passes through the conduit portion 42, through the high pressure filter 19 and the conduit portion 43 into the membrane vessel 16. The permeate fluid fraction is permeated by the membrane means and passes into the low pressure product channels 76 to be collected from the product conduit 77. The concentrate fluid fraction is rejected by the membrane means and passes through the conduit portion 45 into the concentrate surge absorber chamber 66, through the conduit portion 46 and the valve assembly 13 into the expansion chamber 28. The concentrate fluid pressure acts on the rear face of the piston means 25 and hydrostatic pressure energy of the concentrate fluid can be utilized, permitting recovery of a substantial portion of the energy in the feed fluid. Pressure of the concentrate fluid in the expansion chamber 28 is only slightly less than pressure of feed fluid in the pumping chamber 27 and thus, taking into consideration the reduced area of the rear face of the piston upon which pressure of the concentrate fluid acts, an operator has to supply only a fraction of the power that would have been required without energy recovery.

Reversing the reciprocation action manually applied to the lever 54, that is pushing the lever downwards, swings the lever about the hinge pin 55 which acts at the actual fulcrum and the hydraulic bias on the piston means prevents initial upwards movement of the piston means and initially causes the valve spool 49 to move downwards until the downwards movement is limited by the stop 51. In this position, the conduit portion 46 is closed, thus isolating the valve from the surge absorber 15, and the vent conduit 47 is open and communicates with the connecting conduit 48, and is thus exposed to fluid in the expansion chamber 28. When the spool stops, the hydraulic bias is now reversed and the piston means 25 can move upwards on a return stroke, that is opposite to direction of the arrow 74, and the check valve 37 opens to induct feed fluid into the pumping chamber 27 and the check valve 40 closes preventing return flow of fluid from the differential surge absorber. It can be seen that the first valve means is responsive to force applying the reciprocation action to the pump means in such a manner that the reciprocating force transmitted to the pump means is reacted in part by the first valve means. Upwards movement of the piston means also forces concentrate fluid from the expansion chamber through the valve assembly and the vent conduit 47, usually to waste.

As pressure in the feed surge absorber chamber 67 drops slightly as a result of continuing permeation of product water through the membrane means 17, the spring 72 forces the differential surge absorber piston means 64 downwards towards the conduit portions 41 and 42. Force from the spring 72 is augmented by pressure of concentrate fluid from the membrane means flowing into the concentrate surge absorber chamber 66 and acting on the rear face of the piston means 64. Downward movement of the piston means 64 of the differential surge absorber maintains a flow of feed fluid into the membrane vessel and across the membrane means, thus tending to reduce concentration polarization effects that would otherwise occur. Thus, stagnant flow conditions on the concentrate fluid side of the membrane means during the return stroke of the pump means are reduced and there is sufficient displacement of the piston means 64 to maintain adequate flow through the membrane vessel throughout the return stroke. It can be seen that the differential surge absorber 15 serves as a means communicating with the membrane means to provide essentially uniform pressure and feed fluid flow across the membranes during operation of the apparatus. The differential surge absorber communicates with the outfeed and return conduit means and is interposed between the membrane means and the first and second valve means to absorb pressure fluctuations while providing essentially uniform feed fluid flow across the membranes.

Upon reversal of the reciprocation action again, the valve assembly shifts before the piston means changes direction and the operation as previously described will be repeated. Note that the piston means 25 of the pump chamber does not have to travel full stroke of the pump cylinder 24 prior to reversal of piston action, i.e. reversal of pump stroke can occur anywhere in the cylinder 24. Thus, the operator may reverse the lever stroke at any point in its arc of travel as the apparatus is insensitive to the positional limits of lever travel. Because the valve means 13 shifts as a direct result of reversal of reciprocating action applied to the lever, and it always shifts before reversal of pump action because of hydraulic bias which causes the spool 49 to be moved more easily in a particular direction than the piston means 25, the first valve means always shifts in a period when the piston rod means is stationary and there is therefore zero displacement of fluid from the expansion chamber. This is essential for operation of the device as premature displacement of fluid from the expansion chamber before the valve spool has shifted completely would likely result in damage to the apparatus. Thus, it can be seen that as the direction of reciprocation action applied to the lever means is reversed, the piston rod means serves as a fulcrum for the lever to shift the first valve means initially between the two positions thereof. When stopped in either of the two positions, the first valve means then provides a fulcrum for the lever means. In the FIG. 1 embodiment, the three-way valve assembly 13 has a closed center or intermediate position in which all first valve conduits are closed to provide a temporary hydraulic lock for the piston means between the two valve positions. Thus, the lever 54 and the link 57 serve as mechanical linkage means cooperating with the first valve means and the pump means so that reversal of reciprocation action applied to the pump means shifts the first valve means between the first and second positions thereof.

There is thus a time delay or dwell between actuation of the first valve means and transfer of fluid relative to the expansion chamber, and this is attained by interposing a dwell means between the pump means and the first valve means. In the FIG. 1 embodiment, the dwell means is the linkage means and selection of force difference required to shift the valve spool before movement of the piston rod means. Alternative dwell means can be substituted so as to be, in effect, interposed between the pump means and the first valve means. The dwell means determines that reversal of force applying reciprocating action to the pump means shifts the valve means between the first and second positions thereof prior to reversal of pump action in the expansion chamber, i.e. displacement or transfer of fluid. Alternative dwell means are to be described with reference to FIGS. 3 or 5 through 7 and all such dwell means permit actuation of the first valve means during an interval of zero fluid transfer in the expansion chamber which follows completion of a piston stroke. The dwell means accomodates the hydraulic lock of the piston means without destructive shocks.

Thus, in summary, the method is characterized by steps as follows. The feed fluid is inducted into the pumping chamber 27 by the induction stroke of the piston means 25, and simultaneously concentrate fluid is exhausted from the expansion chamber 28. Direction of force applied to the pump means is reversed and the piston is hydraulically biased against movement so that reaction to reversal of force is transmitted to that valve means. This mechanically shifts the first valve means to direct fluid flow between the pump means and the membrane means, dwell means causing the valve means to shift in preference to relative piston movement across a closed intermediate position thereof during an interval of zero fluid transfer in the expansion chamber, thus incurring timely valve shifting. The feed fluid in the pumping chamber is pressurized by a compression stroke of the piston means which forces pressurized feed fluid to the membrane means and simultaneously admits the concentrate fluid fraction from the membrane means into the expansion chamber to supplement energy supplied to the piston in the compression stroke by using pressure of the concentrate fluid. The feed fluid is separated by the membrane means into a permeate fluid which passes through the membrane means and a concentrate fluid fraction which is returned from the membrane means to the expansion chamber to recover some pressure energy for pressurizing the feed fluid.

ALTERNATIVES AND EQUIVALENTS

The first valve means is shown displaced laterally relative to the piston means, however other relative positions can be devised to be within the scope of the invention. If desired, alternative first valve means can be substituted, however an intermediate closed position between the two valve positions is required to hydraulically lock the piston means for a finite period between the two valve positions.

Figure 2:
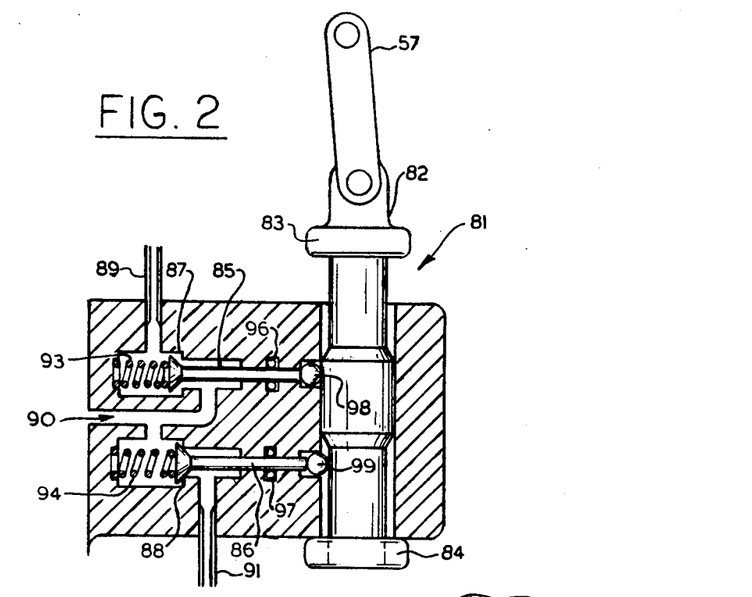
FIG. 2 is a fragmented section of an alternative valve means of the invention.

FIG. 2

An alternative first valve means 81 is for use with the embodiment 10 of FIG. 1 and equivalents, and is a three-way valve having a spool or sliding cam 82 having spaced stops 83 and 84 limiting movement of the spool. The cam 82 actuates two two-way poppet valves 85 and 86 having complementary seats 87 and 88 communicating with conduits as follows. A return conduit portion 89 communicates with the differential surge absorber, not shown, a connecting conduit 90 communicates with the expansion chamber of the pump means, not shown, and a vent conduit 91 communicates with a concentrate fluid outlet, not shown. The valves 85 and 86 have respective springs 93 and 94 which initiate closure of the valve with fluid pressure differences augmenting sealing of the valve. Seals 96 and 97 mounted in stem guides prevents fluid leakage past the stems of the poppet valves, and hardened steel balls 98 and 99 protect the stems against lateral forces. It is mandatory that profile of sliding cam 82 be such that at least one of the poppet valves will remain seated at all times. If both poppet valves were lifted at once, even momentarily, the conduits 89 and 90 would be connected to vent pressure and the apparatus would be inoperative. The spool 82 is connected to the link 57 of FIG. 1, and the means 81 can be directly substituted for the valve assembly 13 and functions similarly.

In operation, the valve is shown in a fully raised position limited by the stop 84, in which position the cam 82 lifts the valve 85 off the seat 87 so that conduits 89 and 90 are connected to admit pressurized concentrate fluid from the membrane means into the expansion chamber. The valve 86 is seated by the spring 94 and unbalanced hydrostatic pressure. On the pump return stroke, the valve 86 is lifted off the seat 88 so as to vent the expansion chamber into the vent conduit 91, and the valve 85 is closed by the spring 93 and hydrostatic pressure, thus preventing concentrate fluid flow from the membrane means.

Figure 3:
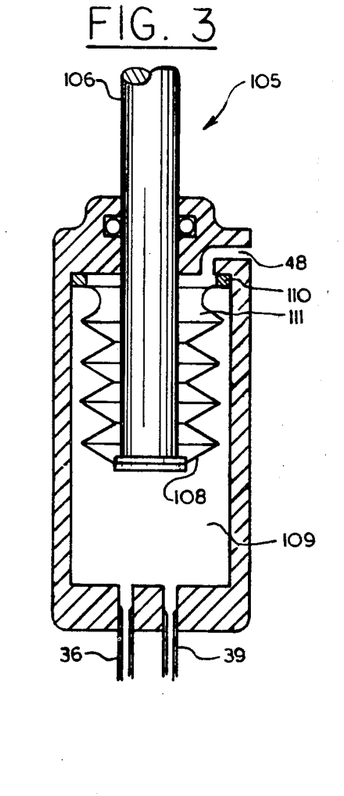
FIG. 3 is a fragmented section of a second embodiment of a piston means for use in the FIG. 1 embodiment.

FIG. 3

An alternative pump cylinder 105 communicates with the inlet conduit 36, the outfeed conduit 39 and the connecting conduit 48, as previously described with reference to FIG. 1. The pump cylinder 105 has an alternative piston rod means 106 which cooperates with a flexible diaphragm or bellows 108 which is secured to the pump cylinder 105 by a static seal 110 at one end thereof and at an opposite end thereof to the piston rod means. The diaphragm thus divides the pumping cylinder into a pumping chamber 109 on one side of the diaphragm and an expansion chamber 111 on an opposite side of the diaphragm and thus separates feed and concentrate fluid fractions and serves as substitution for the piston means of the FIG. 1 embodiment. The flexible diaphragm is feasible because only small differences in hydrostatic pressure normally exist between the pump chamber 109 and the expansion chamber 111. The flexible diaphragm or bellows eliminates the friction losses of the sealing means 30 of the piston means 25 of FIG. 1 and also may simplify manufacturing since tolerances may be less critical. Preferably the diaphragm should be elastically relatively stiff to prevent collapse under pressure differences, because if collapse occurs, its displacement will be reduced and it will not function satisfactorily. Alternatively, the feed fluid can be supplied to the inlet conduit 36 at a boost pressure exceeding exhaust pressure in connecting conduit 48. The diaphragm does not provide rigid boundaries between the feed and concentrate fluids and it can be seen that motion of the piston rod means can cause fluid displacement in the pumping chamber 109 with zero fluid displacement in the expansion chamber 111. Thus the diaphragm is yieldable to fluid pressure as a result of piston rod motion and thus is compliant upon reversal of reciprocation action applied to the lever means. Thus, it can be seen that resilience of the diaphragm provides a means to attain dwell to permit timely valve shifting without fluid transfer in the expansion chamber, and thus serves as an alternative dwell means which can be substituted for, or used in combination with, the dwell means associated with force differences in shifting the valve assembly.

Figure 4:
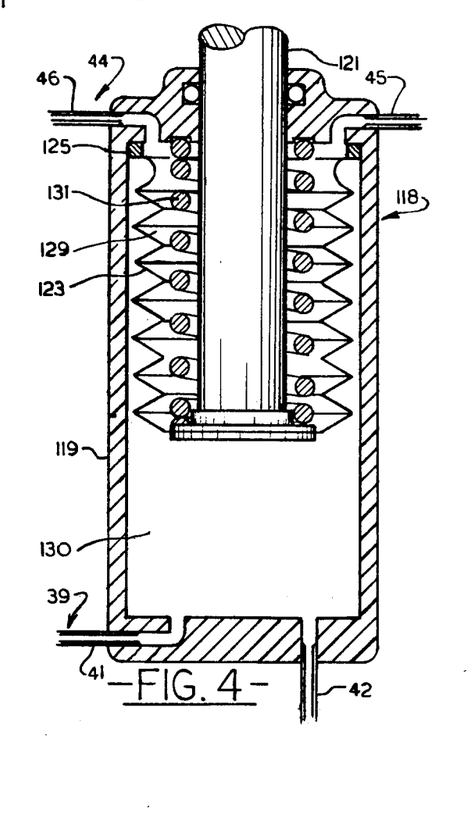
FIG. 4 is a detailed fragmented section of an alternative differential surge absorber for use in the FIG. 1 embodiment.

FIG. 4

An alternative differential surge absorber 118 can be a direct substitution for the differential surge absorber 15 of FIG. 1. The absorber 118 has an alternative cylinder 119 communicating with conduit portions 41 and 42 of the outfeed conduit means 39, and with conduit portions 45 and 46 of the return conduit means 44. The surge absorber 118 has an alternative piston rod means 121 which cooperates with a flexible diaphragm or bellows 123 which is secured to the cylinder by a static seal 125 at one end thereof, and at an opposite end thereof to the piston rod means. The diaphragm divides the cylinder 119 into a concentrate surge absorber chamber 129 and a feed surge absorber chamber 130. A coil spring 131 encircles the piston rod means 121 and functions similarly to the spring 72 of FIG. 1. Consideration relating to the substitution of the rigid piston means 25 of FIG. 1 for the diaphragm means 108 of FIG. 3, apply also to the structure of FIG. 4.

Figures 5, 7:
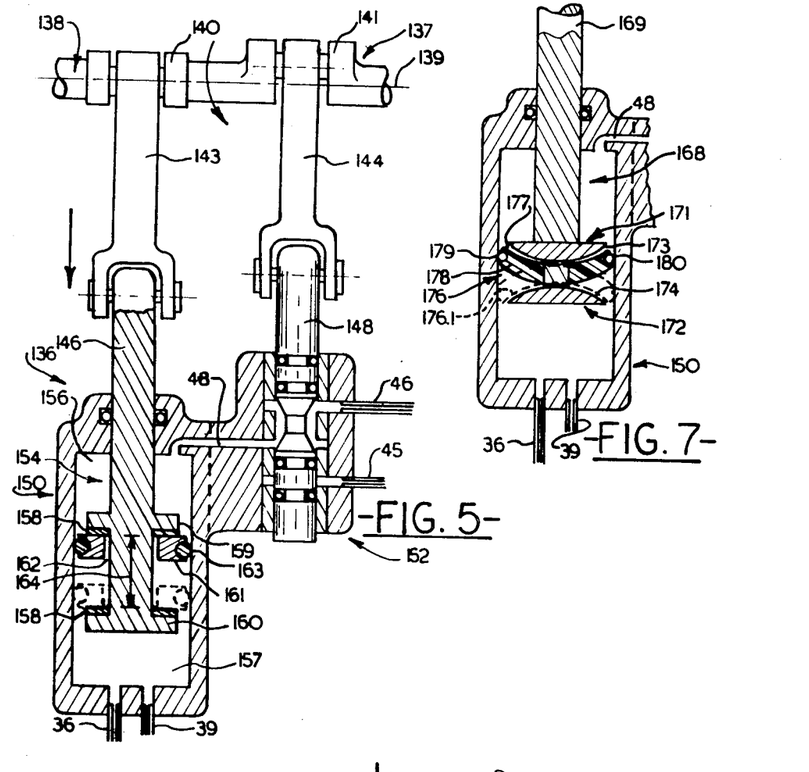
FIG. 5 is a simplified elevation, partially in section, of an alternative crank shaft actuated apparatus according to the invention showing a third embodiment of a piston means with dwell means incorporated therein.
FIG. 7 is a simplified fragmented section of a fourth embodiment of a piston means with dwell means incorporated therein.
Figure 6:
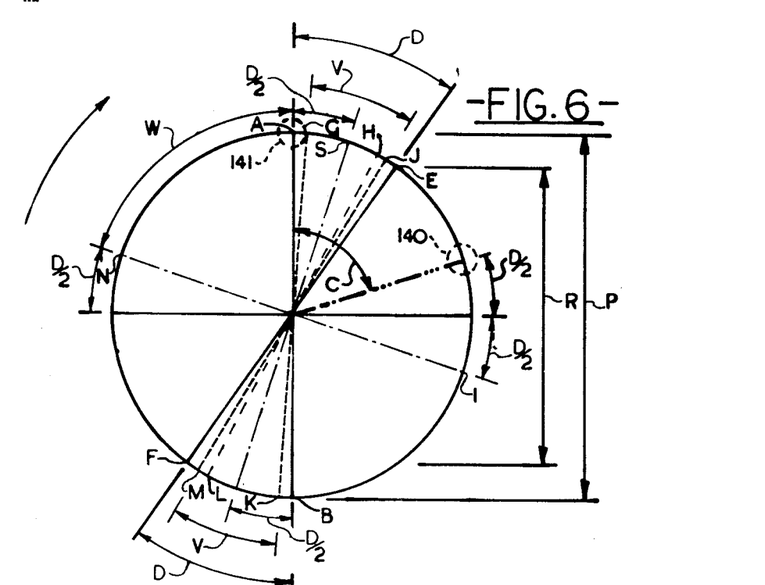
FIG. 6 is a timing diagram showing relative angular positions of piston and valve means of the FIG. 5 embodiment.

FIGS. 5 and 6

A second embodiment 136 of a pump means has an alternative drive means 137 which includes a powered crank shaft 138 mounted in journals, not shown, for rotation about an axis 139. The shaft 138 has a pair of crank pins or throws 140 and 141 spaced at a suitable phase angle, as will be described, the throw 140 being shown at approximately mid-stroke and the throw 141 being shown at top dead center. Connecting rods 143 and 144 connect the throws 140 and 141 to an alternative piston rod means 146 and an alternative valve spool 148 respectively of the pump means 136. The piston rod 146 reciprocates within a pump cylinder 150 which is generally similar to the cylinder 24 of FIG. 1 having inlet and outfeed conduits 36 and 39, and the valve spool 148 cooperates with conduit portions 45 and 46 and connecting conduit 48 of a three-way valve assembly or first valve means 152 which is generally similar to the valve assembly 13 of FIG. 1. Stops on the spool 148, equivalent to the stops 50 and 51 on the spool 49 of FIG. 1 are eliminated in the FIG. 5 embodiment, as spool travel is limited by the crank shaft rotation.

The pump means 136 has an alternative piston means 154 mounted on the rod means 146, the means 154 dividing the pump cylinder into an expansion chamber 156 and a pumping chamber 157. The piston rod means 146 has a pair of spaced stops 159 and 160 fitted with oppositely facing resilient pads 158. The alternative piston means 154 includes a piston disc 161 with a bore 162 accepted as a sliding fit on the piston rod means, the disc being interposed between the pads 158 of the spaced stops and being free to slide between the stops, the pads reducing shock loads when the disc 161 contacts the stops. A dynamic seal 163 surrounds an outer periphery of the piston disc to prevent leakage of fluid past the outer periphery and the cylinder wall. Spacing 164 between the pads 158 of the stops and thickness of the disc are such that the piston rod means 146 can move axially through the disc 161 with negligible movement of the disc between approximately 10 and 20 percent of total piston stroke. Hence the piston disc 161 floats on the piston rod means and the reciprocating stroke of the piston disc 161 will be less than that of the piston rod means 146. Unlike the first embodiment, the ratio of permeate flow to feed flow is no longer given by the simple ratio of piston rod section area to piston area, because the strokes of piston rod and piston are inequal.

Operation of the second embodiment 136 follows closely that of the first, but it is noted that upon reversal of piston rod movement there is relative movement, ie. axial sliding, between the disc 161 and the piston rod means 146 which results in lost motion or dwell of the piston disc following piston rod reversal. In the description following, the piston disc is described as reciprocating between stops on the piston rod means, whereas in fact it reciprocates between the pads 158 on the stops.

FIG. 6 shows piston and valve relative positions and sequences for a complete clockwise revolution of the crank shaft 138, angular spacing being exaggerated for clarity. Top dead center of the throw 140 of the piston rod means is taken as crank shaft datum and is designated A which is immediately prior to a piston compression stroke, and corresponding bottom dead center, which is immediately prior to a piston induction stroke, is designated B. Dwell D is the interval of zero fluid transfer in the expansion chamber following reversal of reciprocating action applied to the drive means and, in this embodiment dwell can be defined as the interval, expressed as angular spacing or phase angle, between commencement of piston rod compression stroke at A and commencement of piston means compression stroke designated E. The same definition applies for a piston rod induction stroke and is angular spacing between B and F. The sequence of operation is as follows. The throws 140 and 141 are indicated in broken outline on the diagram spaced at a phase angle C compatible with FIG. 5, but are shown in different positions relative to the crank shaft datum.

As the piston means is approaching the end of the induction stroke at A, the valve means 152 connects conduits 48 and 45 to vent concentrate fluid from the expansion chamber, while conduit 46 is closed. Fluid pressure in chambers 156 and 157 is low and shortly after A, at G the conduits 48 and 45 are disconnected or closed with the conduit 46 remaining closed. Piston rod means 146 is now moving downwards into the chamber 157, whilst the piston disc 161 remains stationary, the rod means acting as a pump plunger compressing feed fluid in the chamber 157. As pressure in the chamber 157 increases, slightly before E at H the check valve 40 (see FIG. 1) begins to open to deliver feed fluid into the differential surge absorber 15 through the conduit portion 41. Between H and E, at J the first valve means re-opens to connect the conduit portions 48 and 46 at which time pressure in these two conduit portions has already been approximately equalized by the plunger action of the piston rod means, and shortly thereafter at E the stop 159 contacts the piston disc 161 so that the piston disc now moves with the piston rod means, thus terminating the dwell interval D.

Further rotation of the crank shaft 138 completes the piston rod stroke, whilst the valve spool 148 reaches top dead center position of its stroke at I and then starts to descend. At bottom dead center B the piston disc reaches its lower limit in the cylinder, commencing the dwell interval and the check valve 40 closes. Shortly thereafter at K the valve 152 closes the conduits 48 and 46, with the conduit 45 remaining closed. The piston rod means again passes through the stationary piston disc 161 and acts as a pump plunger to withdraw from the chamber 157. When the pressure is fully reduced shortly before F, the check valve 37 opens at L and feed fluid begins to enter the pumping chamber 157 through the conduit 36. Shortly afterwards, at M the valve 152 connects the conduits 48 and 45 at which stage the pressure in the conduits 48 and 45 has been approximately equalized. Shortly thereafter at F, the stop 160 contacts the piston disc 161 terminating the piston dwell period and the piston now commences an induction stroke. The piston disc completes the induction stroke while the valve passes its bottom dead center position at N and then reverses. The piston rod means 146 returns to the top dead center position A, completing the cycle which is then repeated. Angular separation between points A and G, H and J, J and E and corresponding positions on the diametrically opposite side are shown exaggerated and typically might be between 2 and 5 degrees depending on manufacturing tolerances, fluid compressibility and volume changes of the cylinder, etc. due to pressure variations. Dwell D might be between 10 degrees and 30 degrees. Projections P and R from the diagram represent piston rod stroke and piston disc stroke respectively.

To retain the above sequence of valve actuation relative to piston means position, the throw 141 of the valve means must be spaced 90 degrees from a mid-point S of the dwell interval D. Thus, as drawn, the throw 141 is spaced at a phase shift of $$(90 - \frac{D}{2})$$

degrees lagging the throw 140 and thus, valve top center I follows piston top dead center A by a phase shift angle of $$(90 - \frac{D}{2}).$$

Similarly, N preceeds A by a phase shift angle of $$(90 - \frac{D}{2})$$

degrees. The same result may be achieved alternatively by spacing the throw 141 with a phase shift of $$(90 + \frac{D}{2})$$

degrees leading throw 140.

Thus the provision of dwell using a floating piston requires a crank shaft having throws for actuation of the piston and respective valve means to be spaced apart or phased apart at angle other than 90 degrees to accomodate this dwell, at a phase angle of $$(90 \pm \frac{D}{2})$$

degrees. This enables the first valve means to be fully closed during the dwell period, that is the valve closure angle V of the first valve means is overlapped at both ends by the dwell angle D which permits equalization of pressures across conduits of the first valve means about to be opened or closed. Approximate pressure equalization across related conduits increases life of critical valve seals and seats without severe erosion and wear usually experienced with high pressure fluids of low viscosity, low compressiblity and low lubricity. Approximate equalization of pressure differences across conduits about to be opened also reduces the forces that must be applied to actuate the valve means, thus extending life and reliability of valve actuation mechanism. In contrast with the embodiment of FIG. 1 where motion of piston means 25 and the three-way valve 13 is intermittent because of spool travel between the stops of the valve spool, the embodiment 136 of FIG. 5 relies essentially on the position of the piston means as determined by the linkage to interchange smoothly the three-way valve assembly 152 as the piston means reaches its dead center positions at ends of piston stroke in the pump cylinder. It can be seen that both the piston rod means 146 and the valve spool 148 of FIG. 5 have smooth quasi-harmonic reciprocating motion which contrasts with the intermittent motion of the piston means 25 and the spool 49 of FIG. 1. The intermittent motion of the embodiment of FIG. 1 is appropriate for small or low speed units, but the embodiment of FIG. 5 is more appropriate for larger units or higher shaft speeds where discontinuous motion would be unacceptable, and the desired amount of dwell is then provided by floating the piston. With large apparatus where flow momentum effects are material, increasing dwell above the minimum required for valve sequencing further reduces hydraulic shock which might otherwise occur. Clearly, in view of the incompressible character of sea water, the crank shaft actuated apparatus could not function without positive dwell provided by the floating piston means or equivalents. Relatively slow actuation of directional valves conveying a harsh liquid is desirable and this is attained by the quasi-harmonic valve actuation and dwell means. Valve closure angle V can be increased by slowing valve speed or extending closed center portion of the valve spool, but dwell D must overlap V at both ends.

Alternative crank mechanisms equivalent to the simple two throw crank shaft can be substituted to provide separate quasi-harmonic motion of the piston rod means, a piston dwell interval after each reversal of the piston rod means and a 90 degree phase difference from the mid-point of the dwell interval for actuation of the three-way valve. Alternative mechanisms includes for example swash plate drives, scotch yoke drives, axial and radial roller cam drives and others. Clearly, particularly with cam drives, a wide range of piston rod and valve spool accelerations and velocities are possible, and a wide range of dwell separations and periods can be attained by suitable cam design.

The dwell interval should be sufficiently long to enable valve actuation at acceptable speeds and also to enable full pressure equalization across the first valve. Excessively long dwell periods are undesirable in most applications because the piston rod would have acquired considerable velocity at the end of the dwell interval.

FIG. 7

An alternative piston means 168 is shown in the pumping cylinder 150 of FIG. 5 and cooperates with an alternative piston rod means 169 as follows. The piston rod means has a pair of spaced supports 171 and 172 having partially spherical surfaces 173 and 174 disposed oppositely to each other. A flexible disc 176 has a central bore to accept the rod means 169 and has shallowly, convexly curved opposite faces 177 and 178 when in an undeformed state, not shown, and has an outer periphery 179 of slightly larger diameter than bore of the cylinder. The periphery carries a hard wearing, low friction sealing ring 180 which projects from the periphery sufficiently to be in sliding and sealing engagement with cylinder walls. The disc is fitted between the supports and is thus deformed into a saucer-like shape by the cylinder. The disc is sufficiently flexible so that as the piston rod reverses its axial motion, inner portions of the disc flex to follow the rod movement whilst outer portions of the disc remain in static contact with the cylinder walls until limit of deformation of the disc is reached, at which time the periphery of piston disc slides on the cylinder walls. The piston is thus sufficiently compliant to permit, upon reversal of piston rod movement, movement of the piston rod means and adjacent portions of the disc a relatively small amount, typically between about 10 and 20 percent of total piston rod stroke, with negligible sliding of the sealing ring on the cylinder wall. It can be seen that the piston disc deforms from an upwardly convex shape as shown when the piston travels downwards to a downwardly convex shape, shown in broken outline at 176.1, upon reversal of piston rod movement. This deformation of the disc occurs with negligible slippage of the disc relative to the walls. Thus, it can be seen that such a piston disc 176 serves in effect as a resilient, essentially plane diaphragm means carried on the piston rod means and has sufficient resilience to permit piston rod movement with negigible piston disc movement and thus can provide dwell to permit timely valve shifting as previously described.

A resilient piston disc as above described, when used with a crank shaft similar to the crank shaft 138 of FIG. 5, has the important advantage over a rigidly secured piston similar to the sliding piston disc of FIG. 5 in that the first valve means opens or closes conduits only when pressure across the disc has been approximately equalized, thus reducing pressure differences and corresponding flow velocities with resultant erosion. Reducing pressure differences also reduces forces for valve actuation and this correspondingly reduces valve wear.

It can be seen that the flexible piston disc 176 of FIG. 7, the floating piston disc 161 of FIG. 5 and the diaphragm 108 of FIG. 3 are generally equivalent and can be defined as yieldable means associated with the piston means and the piston rod means to permit relative axial movement between a portion of the piston means and the piston rod means in response to reversal of pump action. The yieldable means provide a positive dwell which can be selected for a desired value and is particularly important when the apparatus is used for desalination of brine which has harsh properties of low viscosity, poor lubricity and corrosiveness. Other yieldable means can be substituted to cooperate with piston means and can be used with alternative drive means, a further example of which is described as follows.

Figure 8:
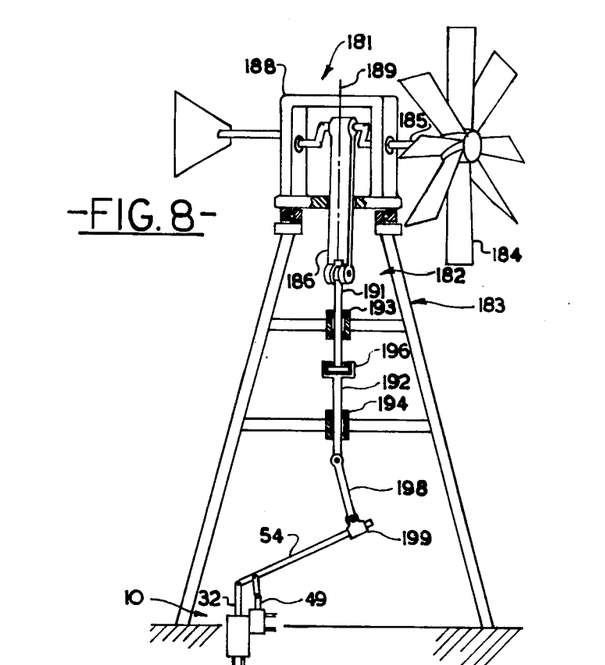
FIG. 8 is a simplified elevation, show partially in section, of a wind powered embodiment of the apparatus of FIG. 1.

FIG. 8

A third embodiment 181 of the invention is adapted for wind power and has a supporting frame 183 and a mechanical drive means 182 which utilizes power from a horizontal axis wind turbine 184 which drives a crank shaft 185. The shaft 185 has a connecting rod 186 and is journalled in a yoke 188 which is journalled for rotation about a vertical axis 189 relative to the frame 183 to permit the turbine to operate in all wind directions. Aligned shafts 191 and 192 are carried in bushings 193 and 194 mounted in the frame 183, and a swivel coupling 196 connects the shafts to permit relative rotation therebetween with negligible axial relative movement. The shaft 191 is hinged to the connecting rod 186 and the shaft 192 is hinged to a link 198. The link 198 is hinged to a coupling 199 secured to the lever 54 of the first embodiment 10 of the apparatus. The lever 54 cooperates with the piston rod means 32 and the valve spool 49 as previously described, and it can be seen that the coupling 199 can be shifted axially along the lever 54 and thus adjust pump stroke with a corresponding change in average torque requirement for the crank shaft 185. When used with a wind turbine, axial adjustment of the coupling can be useful to adjust pump delivery to prevailing wind speed and also to unload the wind turbine for easier starting.

Clearly, the mechanical drive means 182 of FIG. 8 can be applied to drive the lever 54 from any low speed rotating shaft powered by any prime motor. If the orientation of the shaft is fixed in such applications, the swivel 196 and the aligned shafts 191 and 192 can be eliminated and a single connecting shaft substituted. It may be convenient in some installations to connect the connecting rod 186 directly to the coupling 199 without intervening linkage.

Figure 9:
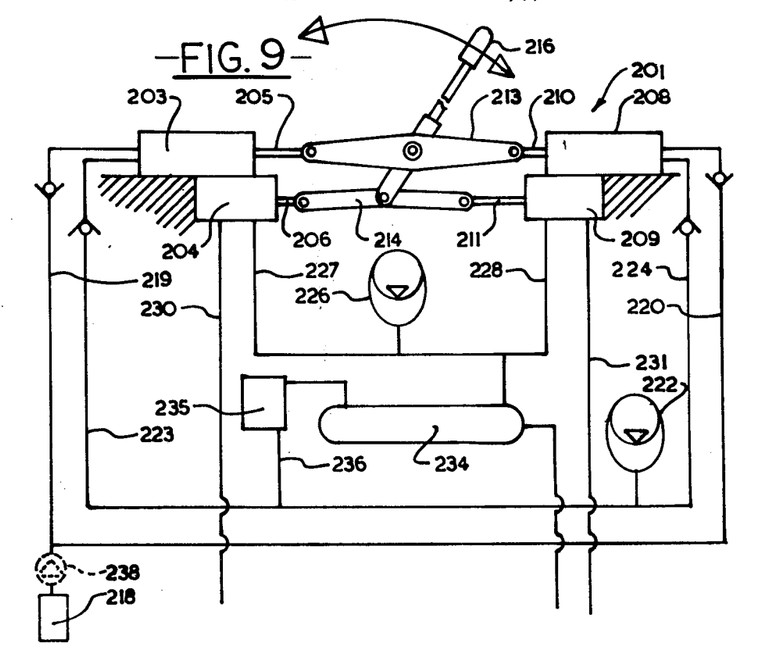
FIG. 9 is a schematic of a lever actuated apparatus of the invention having two cylinders.

FIG. 9

An alternative multi-cylinder embodiment 201 of the invention has a first pump means and first valve means 203 and 204 having piston rod means and valve actuating means 205 and 206 respectively. The valve actuator can be an outer portion of the valve spool or equivalent means to shift the three-way directional valve. The embodiment 201 has a similar second pump means 208 with respective first valve means 209, piston rod means 210 and valve actuating means 211, the pump cylinders and first valve means being directly opposed to each other to minimize side loads on the piston rod means and the valve actuators. A piston rod connecting means 213 aligns and connects the piston rod means 205 and 210 of the first and second pump means, and an articulated valve actuator connecting means 214 connects the valve actuators 206 and 211 of the first valve means of the first and second pump means. A lever means 216 serving as a drive means for both pumps is hinged to the piston rod connector means and the valve actuator connecting means of both the first and second pump means, so that reciprocation of the lever means simultaneously actuates the piston means of both pump means so as to actuate the pump means in reverse phase to each other. Respective first valve means of each pump means are actuated essentially simultaneously shortly after reversal of the piston stroke.

A feed fluid source 218 communicates with inlet conduits 219 and 220 of the first and second pump means, and a conventional independent surge absorber 222 communicates with outfeed conduit means 223 and 224 extending from the first and second pump means. An independent conventional concentrate surge absorber 226 communicates with return conduit means 227 and 228 communicating with the first valve means 204 and 209 of the first and second pump means respectively. Vent conduits 230 and 231 extend from the first valve means 204 and 209 to dump concentrate fluid fractions and a membrane vessel 234 and high pressure filter 235 in conduit 236 communicates with the return conduit means 228 and the outfeed conduit means as shown. When two or more pump cylinders are provided phased equally apart, feed flow fluctuations across the membrane means are reduced thus permitting reduction of differential surge absorber displacement, or use of conventional accumulators as disclosed above.

In operation, it can be seen that pumping chamber and expansion chamber of the first pump means, not shown, feed fluid to the membrane means and receive fluid from the membrane means respectively, whilst the pumping chamber and expansion chamber of the second pump means admits feed fluid from the fluid source and discharges concentrate fluid respectively so as to reduce fluid flow variations across the membranes.

Thus, the two cylinder arrangement with the conventional accumulators serves as means to provide essentially uniform pressure and feed fluid flow across the membranes. Thus, multiple pump means in combination with accumulators can be considered equivalent to the differential surge absorber of FIG. 1. The surge absorbers can be spring-loaded pistons or diaphragms as shown for the differential surge absorbers, or alternatively other types of surge absorbers known in the art, including pneumatic bladder accumulators or weight-loaded piston accumulators can be used.

Clearly, one of the first valve means can be eliminated by combining in one valve assembly a spool which has a function of a four-way valve to open respective chambers of one pump means whilst closing chambers of the remaining pump means. Other variations are envisaged, such as providing mechanical actuation of the non-return check valves in the inlet and outfeed conduits.

A further variation in the method of operating the invention is applicable when two or more pumps phased equally apart are used. Some or all of the energy required to power the pump may be provided by pressurizing the feed fluid by a relatively low powered external feed pump means to a pressure below the membrane working pressure. A feed pump 238 is shown in broken outline in the inlet conduit extending from the feed fluid source 218, so as to pressurize the inlet conduits 219 and 220. If the feed fluid has a sufficiently high pressure prior to entry into pump means, no further mechanical energy need be supplied to drive the system by either lever or crank mechanism. The lever 216 of FIG. 9 would then provide only a valve timing function.

I claim:

1. A method of membrane separation of a feed fluid into permeate fluid and concentrate fluid fractions which respectively are permeated and rejected by selective membrane means, the membrane means being exposed to pressurized feed fluid supplied by a reciprocating pump means having a cylinder and piston means and cooperating with valve means in conduit means, the piston means dividing the cylinder into a pumping chamber in which feed fluid is pressurized and an expansion chamber in which the concentrate fluid is depressurized; the method being characterized by steps of:
   (a) inducting feed fluid into the pumping chamber by an induction stroke of the piston and simultaneously exhausting concentrate fluid from the expansion chamber,
   (b) reversing direction of force applied to the pump means and simultaneously hydraulically biasing the piston means against movement due to reversal of force so that reaction to reversal of force is transmitted to the valve means causing the valve means to shift in preference to relative piston means movement so as to mechanically shift the valve means to direct fluid flow between the pump means and the membrane means, the transfer of reaction forces causing a dwell period so that the valve means shifts across a closed intermediate position thereof during an interval of substantially zero fluid transfer in the expansion chamber thus incurring timely valve shifting,
   (c) pressurizing the feed fluid in the pumping chamber by a compression stroke of the piston means which forces pressurized feed fluid to the membranes, and admitting the concentrate fluid fraction from the membrane means into the expansion chamber to supplement energy supplied to the piston in the compression stroke by using pressure of the concentrate fluid,
   (d) separating the feed fluid into a permeate fluid fraction which passes through the membranes, and a concentrate fluid fraction which is returned from the membranes to the expansion chamber to recover some fluid pressure for pressurizing the feed fluid.

2. A method as claimed in claim 1 in which the feed fluid is pressurized by external means to provide additional energy to supplement energy provided by the mechanical power means.

3. A method as claimed in claim 1 further characterized by:
   (a) storing a volume of feed fluid under a pressure sufficient to maintain adequate flow over the membrane means during reversal of the stroke of the piston means,
so as to maintain essentially uniform feed fluid pressure and flow across the membranes to reduce concentrate polarization effects.

4. A method as claimed in claim 1 further characterized by:
   (a) permitting yielding between the piston means and the piston rod means so that there is relative movement therebetween to provide the dwell interval between valve shift and reversal of pumping action.

5. A method as claimed in claim 1 further characterized by:
(a) upon reversal of the reciprocating force, using a first portion of a following reciprocating stroke to shift the valve means, and a remaining portion of the stroke to cause relative piston means movement.

6. A pumping apparatus for a membrane separation apparatus for separation of a feed fluid into permeate fluid and concentrate fluid fractions which respectively are permeated and rejected by selective membrane means, the pumping apparatus being characterized by:
(a) a reciprocating pump means having a cylinder and moveable piston means, the piston means dividing the cylinder into a pumping chamber in which the feed fluid is pressurized and an expansion chamber in which the concentrate fluid fraction is depressurized, the piston means cooperating with piston rod means extending through the expansion chamber with sealing means to prevent leakage of fluid from the cylinder, the cylinder and piston rod means having relative diameters which define cylinder/piston rod proportions such that ratio of swept volume of piston rod means to swept volume of the piston means determines recovery ratio of permeate fluid fraction to total feed fluid flow,
(b) inlet conduit means communicating with the pumping chamber to admit feed fluid into the pumping chamber,
(c) outfeed conduit means adapted to communicate the pumping chamber with the membranes so as to conduct pressurized feed fluid from the pumping chamber to the membranes,
(d) return conduit means adapted to communicate the membranes with the expansion chamber so as to conduct the concentrate fluid fraction from the membranes to the expansion chamber,
(e) means communicating with the outlet and return conduit means to reduce fluctuations in pressure and feed fluid flow across the membrane means,
(f) first and second valve means, the first valve means communicating with the expansion chamber and having a closed intermediate position between first and second positions, the second valve means being non-return valve means communicating with the pumping chamber, the first and second valve means cooperating with the conduit means so as to direct fluid flow from a feed fluid source and to and from the membrane means,
(g) reciprocable mechanical drive means mechanically connected to the pump means and the first valve means so that the first valve means is responsive to force applying the reciprocation action to the pump means in such a manner that reciprocating force transmitted to the pump means is reacted in part by the first valve means such that reversal of force reverses the valve means,
(h) dwell means associated with the pump means to ensure that the first valve means is shifted during an interval of substantially zero fluid transfer in the expansion chamber, the dwell means being characterized by a hydraulic bias effect acting on the piston means to inhibit relative motion of the piston means in one direction as determined by the position of the first valve means and to permit relative piston motion in the opposite direction, such that following reversal of force applied to the pump means, the first valve means shifts between the first and second positions thereof prior to reversal of pumping action, so that in a first position of the first valve means pressurized feed fluid from the pumping chamber is fed to the membranes through the second valve means while concentrate fluid is discharged into the expansion chamber through the first valve means, so that depressurization of the concentrate fluid returning from the membrane means assists in pressurizing of the feed fluid, and in a second position of the first valve means depressurized concentrate fluid is exhausted from the expansion chamber through the first valve means while feed fluid is inducted into the pumping chamber through the second valve means.

7. Pumping apparatus as claimed in claim 6 in which the dwell means is further characterized by:
(a) yieldable means associated with the piston means and the piston rod means to permit, upon reversal of pump action, relative axial movement between a portion of the piston means and the piston rod means permitting the piston rod means to commence a stroke prior to displacement of fluid from the expansion chamber by the piston means, so that fluid pressures across the conduits of the first valve means that are about to be connected are approximately equalized prior to actuation of the first valve means.

8. Pumping apparatus as claimed in claim 7 in which the yieldable means is characterized by:
(a) the piston rod means having a pair of spaced stops,
(b) the piston means have a disc with a bore accepted as a sliding fit on the piston rod means, the disc being interposed between the stop means, spacing between the stops and thickness of the disc permitting relative axial sliding between the disc and the piston rod limited by the stop means so that piston stroke is less than piston rod stroke.

9. Pumping apparatus as claimed in claim 7 in which the yieldable means is characterized by:
(a) a resilient piston means mounted on the piston rod means having a periphery in sliding sealing contact with the pump cylinder, the resilience permitting, upon reversal of piston means stroke, movement of the rod relative to the piston means with negligible movement of the periphery relative to the cylinder.

10. Pumping apparatus as claimed in claim 6 in which the piston means and dwell means are further characterized by:
(a) flexible diaphragm means attached to said piston rod means and separating the pump chamber from expansion chamber, so that resilience of the diaphragm permits the piston rod means to move without fluid transfer in the expansion chamber so as to essentially equalize fluid pressures across conduits to be connected prior to shifting of the first valve means.

11. A pumping apparatus as claimed in claim 6 further including:
(a) a second pump means having a respective cylinder, piston rod means and first valve means, the respective cylinders and first valve means of the first and second pump means cooperating with each other to provide approximately uniform feed fluid flow, (b) a piston rod connecting means connecting the piston rod means of the first and second pump means, (c) a valve actuator connecting means connecting valve actuators of the first valve means of the first and second pump means, and the drive means is characterized by:

(d) a lever means hinged to the piston rod connecting means and to the valve actuator connecting means, so that reciprocation of the lever means simultaneously actuates the piston rods of both the pump means so as to actuate the pump means in reverse phase to each other, and the respective first valve means of each pump are actuated essentially simultaneously shortly after reversal of piston rod means stroke so that a pumping chamber and expansion chamber of the first pump means feed fluid to the membrane means and receives fluid from the membrane means respectively, whilst the pumping chamber and expansion chamber of the second pump means admits feed fluid from the fluid source and discharges concentrate fluid respectively so as to reduce fluid flow variations across the membranes, thus serving as means to provide essentially uniform pressure and feed fluid flow across the membrane means.

12. A pumping apparatus as claimed in claim 6 in which the means to provide uniform fluid flow across the membranes includes:

(a) a differential surge absorber means communicating with the outfeed and return conduit means and interposed between the membrane means and the first and second valve means to absorb pressure fluctuations thus providing essentially uniform feed fluid flow.

13. A pumping apparatus as claimed in claim 12 in which:

(a) the cylinder and piston rod means of the pump means have relative diameters which define cylinder/piston rod proportions such that ratio of swept volume of piston rod means to swept volume of the piston means determines recovery ratio of permeate fluid fraction to total feed fluid flow, (b) and the differential surge absorber is a cylinder and a piston means, the piston means being spring-loaded and double-acting and reciprocable with the cylinder, the cylinder and piston means of the differential surge absorber being of similar proportions to the cylinder and piston rod means of the pump means but having a displacement several times greater.

14. Pumping apparatus as claimed in claim 12 in which the differential surge absorber is characterized by:

(a) a cylinder and a piston means, the piston means dividing the cylinder into a concentrate surge absorber chamber and a feed surge absorber chamber, the feed surge absorber chamber being exposed to pressurized feed fluid in the outfeed conduit and the concentrate surge absorber chamber being exposed to the concentrate fluid fraction in the return conduit means, (b) the piston means cooperates with a piston rod means extending through the concentrate surge absorber chamber with sealing means to seal the surge absorber against leakage, (c) spring means cooperating with the piston means to force the piston in a direction to exhaust the feed surge absorber chamber.

15. Pumping apparatus as claimed in claim 14 in which the piston means of the differential surge absorber is characterized by:

(a) a flexible diaphragm means attached to the piston rod means and separating the feed surge absorber chamber from the concentrate surge absorber chamber.

16. Pumping apparatus as claimed in claim 6 in which:

(a) the first valve means is a two-position, centre-closed, three-way valve having a movable spool, the spool having travel between the two positions limited by stops.

17. Pumping apparatus as claimed in claim 16 in which the first valve means is further characterized by:

(a) the spool serving as a cam means, (b) a pair of normally-closed, two-way poppet valves to close respective conduit means, the poppet valves being unseated and opened by the cam means, the cam means being adapted to unseat and open one poppet valve whilst leaving the remaining poppet valve seated and closed, so that both poppet valves are never open simultaneously.

18. A pumping apparatus as claimed in claim 6 in which the reciprocable drive means and dwell means are characterized by:

(a) a lever means connecting the piston rod means to the first valve means, so that the first valve means shifts between the first and second positions thereof as direction of reciprocating action of the lever means is reversed, the hydraulically biased piston serving as a fulcrum for the lever.

19. A pumping apparatus as claimed in claim 18 further characterized by:

(a) the first valve means having a spool means reciprocable between the first and second positions, (b) a link connecting the lever means to the spool means, (c) the lever means being hinged to the piston rod means, so that as the direction of the reciprocating action applied to the lever means is reversed, the piston rod means provides a fulcrum for the lever means to shift the first valve means initially between the two positions thereof, and when stopped in either of the two positions thereof, the first valve means provides a fulcrum for the lever means to apply a reversed force to the pump means.

* * * * *